United States Patent [19]
Eum et al.

[11] Patent Number: 6,155,897
[45] Date of Patent: Dec. 5, 2000

[54] TOP BRACING FOR MARINE ENGINE

[75] Inventors: Jae Kwang Eum; Seung Yong Han; Bu Do Kim, all of Kyungsangnam-do, Rep. of Korea

[73] Assignee: Samsung Heavy Industries Co, Ltd., Seoul, Rep. of Korea

[21] Appl. No.: 09/453,230

[22] Filed: Dec. 3, 1999

[30] Foreign Application Priority Data

Dec. 4, 1998 [KR] Rep. of Korea ........................ 98-53014

[51] Int. Cl.[7] .................................................. B63H 21/30
[52] U.S. Cl. ........................................... 440/111; 248/638
[58] Field of Search ............................ 440/52, 111, 112; 248/637, 638

[56] References Cited

U.S. PATENT DOCUMENTS

| | | | |
|---|---|---|---|
| 3,259,099 | 7/1966 | Kiekhaefer | 440/111 |
| 5,509,837 | 4/1996 | Allbright, Jr. et al. | 440/111 |
| 5,975,972 | 11/1999 | Wilmsen | 440/111 |

*Primary Examiner*—Stephen Avila
*Attorney, Agent, or Firm*—Birch, Stewart, Kolasch & Birch, LLP

[57] ABSTRACT

Disclosed is a top bracing for a marine engine. The top bracing comprises a beam part for transmitting vibration load of the engine to a hull structure; a hull connection part for connecting the beam part to the hull structure; and an engine connection part for connecting the engine to the beam part. One of either the hull connection part or the engine connection part includes a pair of pressing plates connected to the beam part and arranged parallel to each other with a predetermined distance therebetween, a pair of friction support brackets fastened to the hull structure or the engine such that they are close to outer surfaces of the pair of pressing plates, respectively, and an elastic member intervened between the pair of pressing plates for damping the vibration load of the engine by adjusting pressing force which is applied by the pair of pressing plates to the pair of friction support brackets.

10 Claims, 7 Drawing Sheets

TOP BRACING FOR MARINE ENGINE

BACKGROUND OF THE INVENTION

1. Field of the Invention

The present invention relates to a top bracing of a marine engine, and more particularly, the present invention relates to a top bracing of a marine engine, which is used to connect an upper end of the marine engine to a hull structure for damping vibration generated by the marine engine.

2. Description of the Related Art

Generally, in a ship, a great amount of vibration is generated while a marine engine runs. The vibration of the is marine engine accelerates fatigue fracturing of the marine engine itself and its surrounding components and deteriorates on-board comfortableness. Therefore, because the vibration of the marine engine acts as an undesirable factor, wherever possible, it is preferred to damp the vibration. As means for damping the vibration of the marine engine, a method for connecting an upper end of the marine engine to a hull structure by using a top bracing is widely used.

FIG. 6 is a schematic longitudinal cross-sectional view of a ship, illustrating an installation position of a top bracing for a marine engine. As shown in FIG. 6, a marine engine 3 of a ship 1 is fixedly mounted on an engine mounting 4. In this state, if the engine 3 runs, an upper end of the engine 3 is fiercely vibrated. Accordingly, in the ship 1, a top bracing 100 is installed between the hull structure 2 and the engine 3 to damp the vibration of the engine 3.

FIG. 7 is a front view illustrating a conventional top bracing for a marine engine; and FIG. 8 is a plan view of the conventional top bracing for a marine engine of FIG. 7. As shown in FIGS. 7 and 8, a conventional top bracing 100 includes a pair of engine connection plates 110 which are connected to the engine 3, a pair of hull connection plates 120 which are connected to the hull structure 2, and a connection beam 150 which connects the pair of engine connection plates 110 and the pair of hull connection plates 120 with each other.

The hull connection plates 120 are coupled to a projection plate 140 of the hull structure 2 via a pair of friction plates 130 by bolts 141 and nuts 142. The friction plates 130 allow the pair of hull connection plates 120 to be moved to some extent. The extent to which the hull connection plates 120 are moved, can be regulated by tightening or loosening the bolts 141.

Although the conventional top bracing 100 constructed as mentioned above can effectively damp transverse vibration of the marine engine 3, it cannot damp in a sufficient manner multi-directional stress, such as torsional stress, due to relative height variations between the hull structure 2 and the engine 3 which can be caused by a change in wave or draft, etc. while the ship 1 is afloat.

Especially, connecting portions among the hull structure 2, engine 3, engine connection plates 110, hull connection plates 120, projection plate 140 and connection beam 150 are likely to be fatigued and thereby to produce cracks, etc. due to the presence of residual stress, material deformation, weld defects, etc. which are created in the course of welding. Once cracks are produced in one of the components, other components are also consecutively cracked to further develop the vibration, by which the likelihood of the engine 3 to be adversely influenced is increased, and according to this, repairing and replacing operations for the top bracing 10 must be frequently performed, which are troublesome.

In other words, in the case that the conventional top bracing 100 is used, when considering a graph illustrating a vibration response curve which representatively reveals engine vibration characteristics and shows a relationship between engine rpm and engine vibration, as shown in FIG. 9, the vibration response curve has one apex. Here, the apex of the vibration response curve represents engine rpm which corresponds to a natural frequency of the engine. Once the conventional top bracing 100 is mounted to the engine 3, because its natural frequency f0 is fixedly determined and unchanged, as engine rpm approaches to the natural frequency f0, the vibration is severely generated, thereby causing some or all of the above-mentioned problems.

Furthermore, in the connecting portions for the hull structure 2 of the conventional top bracing 100, because the hull connection plates 120 are connected to the hull structure 2 via the friction plates 130 and projection plate 140 by bolts 141 and nuts 142, the hull connection plates 120 have some flexibility which acts against the vibration of the engine. However, in the connecting portions for the engine 3 of the conventional top bracing 100, because the connection beam 150 is directly jointed through the engine connection plates 110 to the engine 3 by welding, a problem is caused in that it is impossible to flexibly support the engine 3.

Besides, while it is the norm that a top bracing is prefabricated on the ground and then moved onto a ship thereby to be mounted, in the case of the conventional top bracing 100, once the top bracing 100 is prefabricated, it is difficult to adjust a length of the top bracing 100. Therefore, when the top bracing 100 is prefabricated on the ground, it is necessary to accord with a high precision the length of the top bracing 100 to a length measured between the hull structure 2 and the engine 3, thereby to ease mounting operations for the top bracing 100. Nevertheless, since the length between the hull structure 2 and the engine 3 can vary to some extent with an error, difficulties are caused in precisely according the length of the top bracing 100 to the length measured between the hull structure 2 and the engine 3 when prefabricating the top bracing 100 on the ground.

By reason of this, when the conventional top bracing 100 is mounted to the engine 3, a length of the top bracing 100 must be frequently readjusted such that it corresponds to an actual length between the hull structure 2 and the engine 3, which may turn out to be cumbersome and in the course of which weld defects may be created.

SUMMARY OF THE INVENTION

Accordingly, the present invention has been made in an effort to solve the problems occurring in the related art, and a primary object of the present invention is to provide a top bracing for a marine engine and a method for damping vibration of the marine engine using the same, which can minimize the vibration of the marine engine over an entire rpm range by altering a supporting state (a supporting rigidity) for the marine engine depending upon a change in engine rpm.

Another object of the present invention is to provide a top bracing for a marine engine, which can flexibly support the marine engine, whereby mounting and repairing operations of the top bracing are enabled to be easily performed.

In order to achieve the above object, according to the present invention, there is provided a top bracing for a marine engine, which functions to connect an upper end of the marine engine to a hull structure for damping vibration of the marine engine, wherein the vibration of the marine engine is transmitted to the top bracing having an air tube such that a supporting state for the marine engine is altered and accordingly engine vibration characteristics have a plurality of vibration response curves, and an internal air pressure of the air tube is adjusted depending upon actual engine rpm such that the supporting state for the marine engine is altered and accordingly the vibration of the marine engine is optimally damped over an entire rpm range of the marine engine.

In a concrete way, according to one aspect of the present invention, there is provided a top bracing for a marine engine, comprising: a beam part for transmitting vibration load of the engine to a hull structure; a hull connection part for connecting the beam part to the hull structure; and an engine connection part for connecting the engine to the beam part; one of either the hull connection part or the engine connection part including, a pair of pressing plates connected to the beam part and arranged parallel to each other with a predetermined distance therebetween, a pair of friction support brackets fastened to the hull structure or the engine such that they are close to outer surfaces of the pair of pressing plates, respectively, and an elastic member intervened between the pair of pressing plates for damping the vibration load of the engine by adjusting pressing force which is applied by the pair of pressing plates to the pair of friction support brackets.

According to another aspect of the present invention, the other of either the hull connection part or the engine connection part includes a connection plate possessing a slot which is defined therein and having one end which is connected to the hull structure or the engine and the other end which is connected to the beam part by means of bolts and nuts, the bolts passing through the slot.

According to still another aspect of the present invention, there is provided a method for damping vibration of a marine engine, comprising the steps of: learning engine vibration characteristics by changing an internal air pressure of an air tube in a state wherein a top bracing having the air tube is mounted between a hull structure and the engine, to alter an engine support rigidity, and by obtaining a critical rpm from engine vibration response curves for respective states which have different support rigidities; comparing a current engine rpm with the critical rpm; and holding the internal air pressure of the air tube at a relatively high pressure under an engine operating condition in which the current engine rpm is not greater than the critical rpm and at a relatively low pressure under another engine operating condition in which the current engine rpm is greater than the critical rpm.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
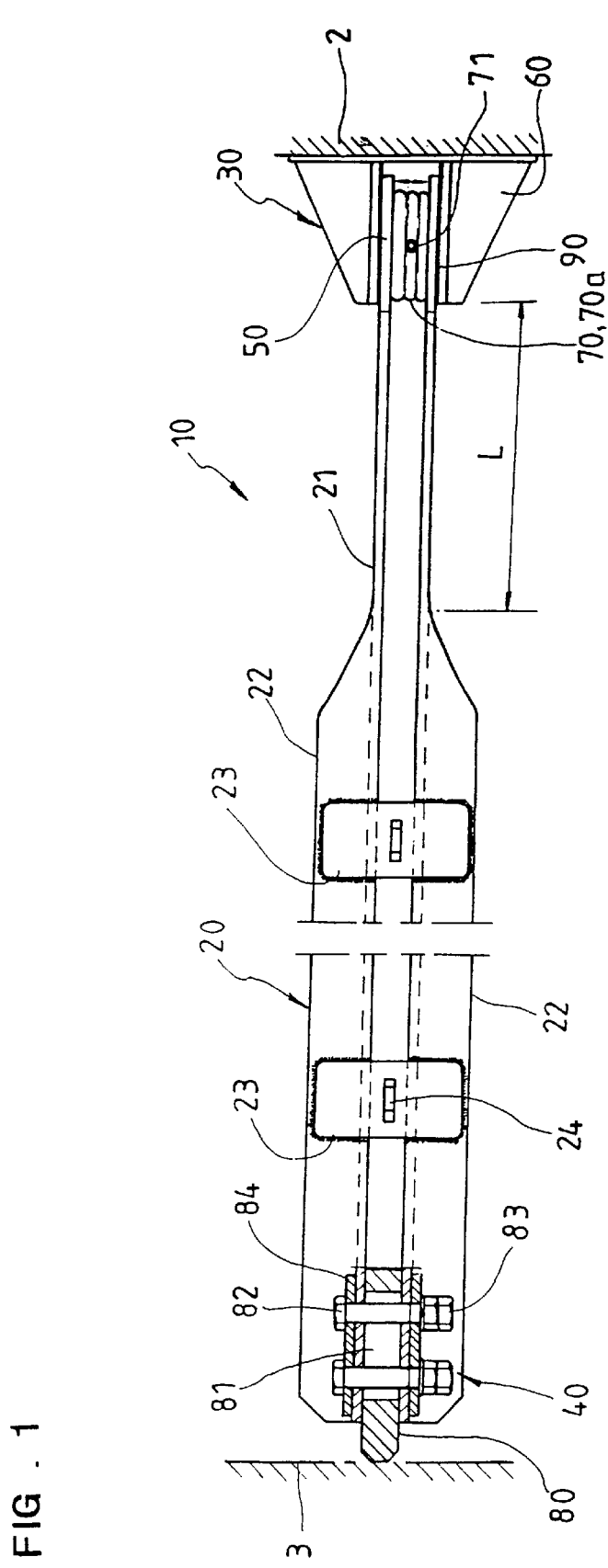
FIG. 1 is a plan view illustrating a top bracing for a marine engine in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
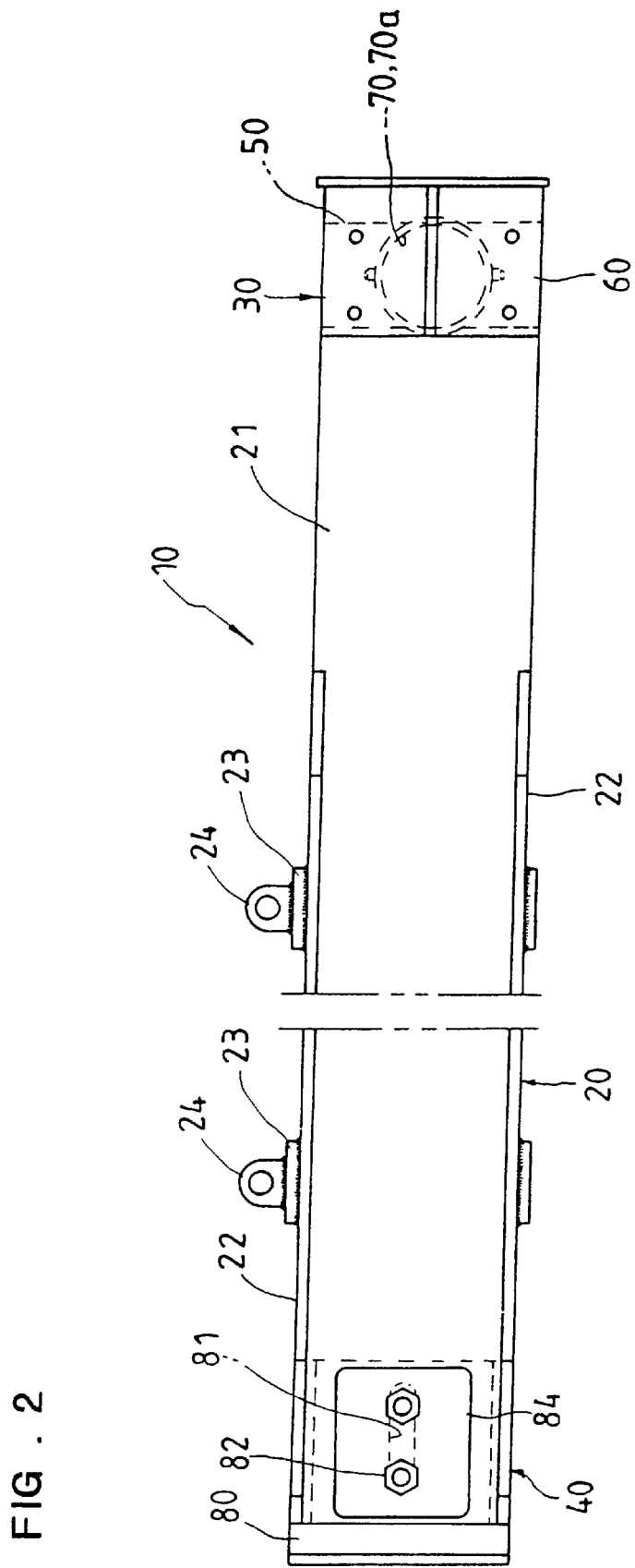
FIG. 2 is a front view of the top bracing for a marine engine of FIG. 1.
Figure 3:
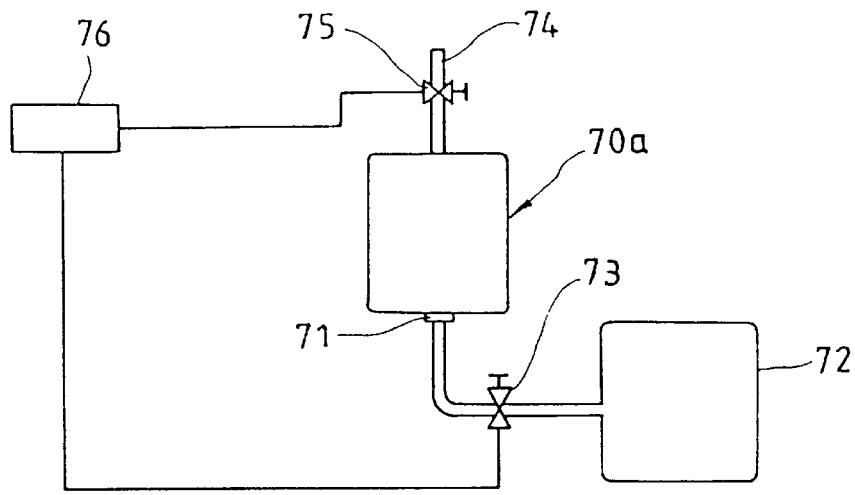
FIG. 3 is a systematic diagram illustrating an example of a pressure adjusting system for an air tube.
Figure 4:
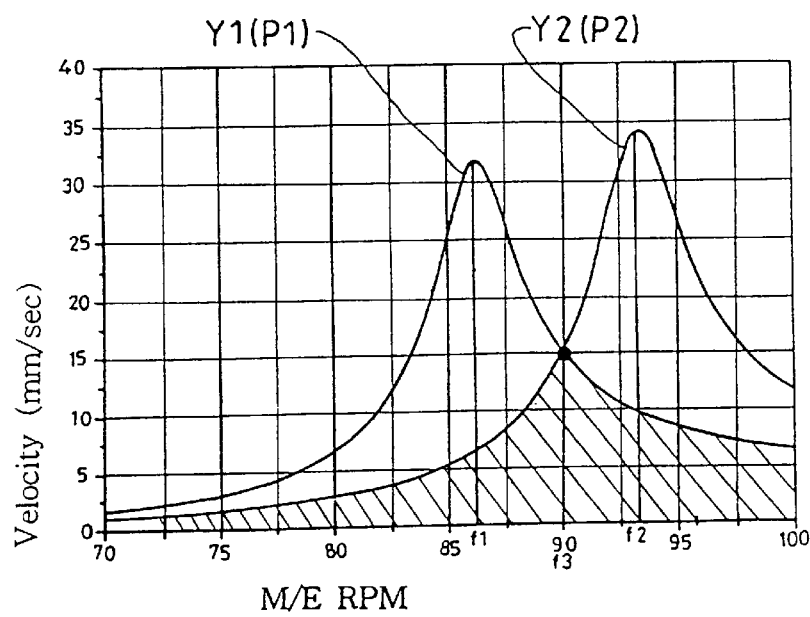
FIG. 4 is a graph illustrating vibration response curves which reveal relationships between engine rpm and engine vibration when the top bracing according to the present invention is applied to damp vibration of the marine engine.
Figure 5:
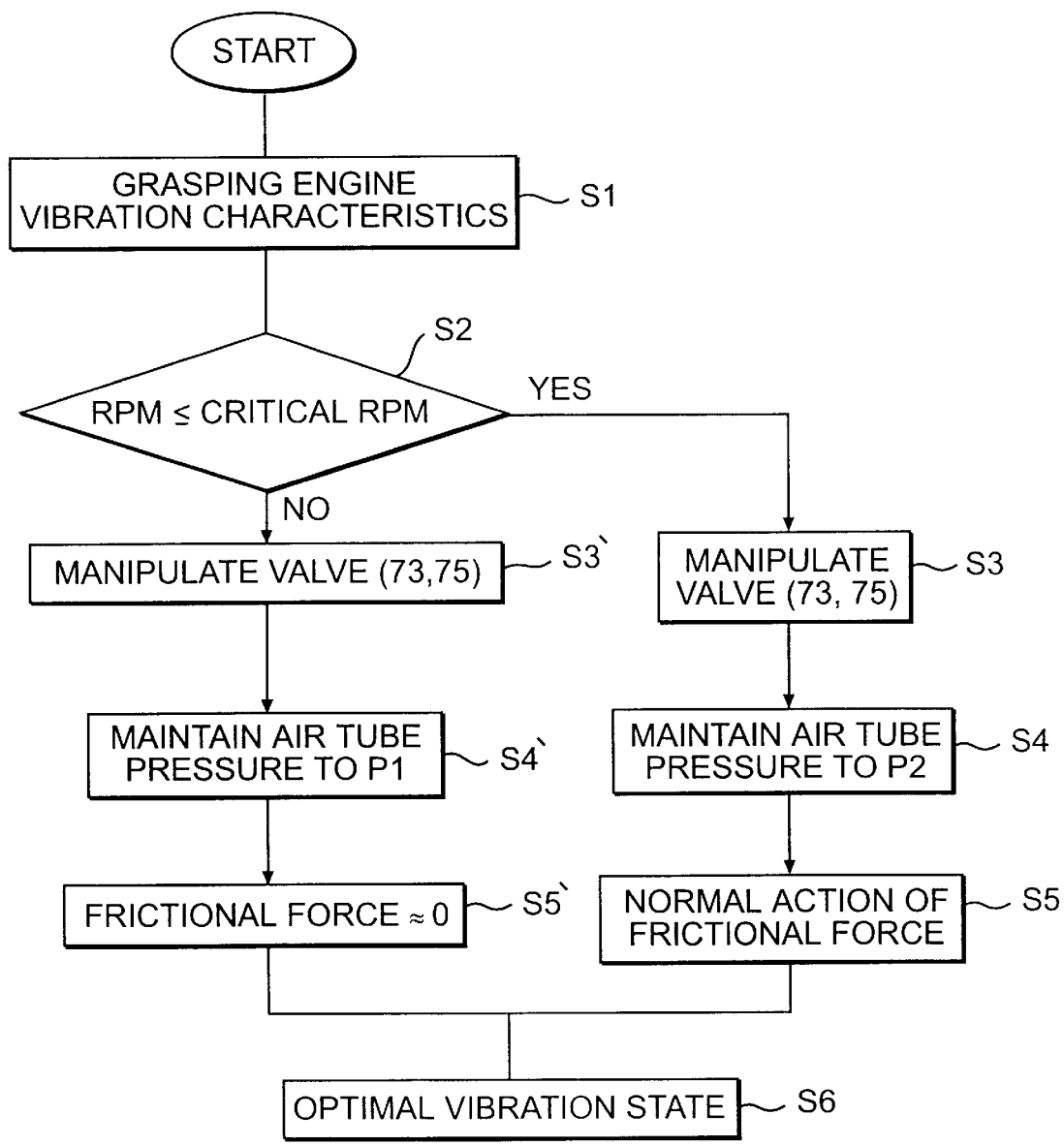
FIG. 5 is a flow chart for explaining a method for damping vibration of the marine engine by the top bracing according to the present invention.
Figure 6:
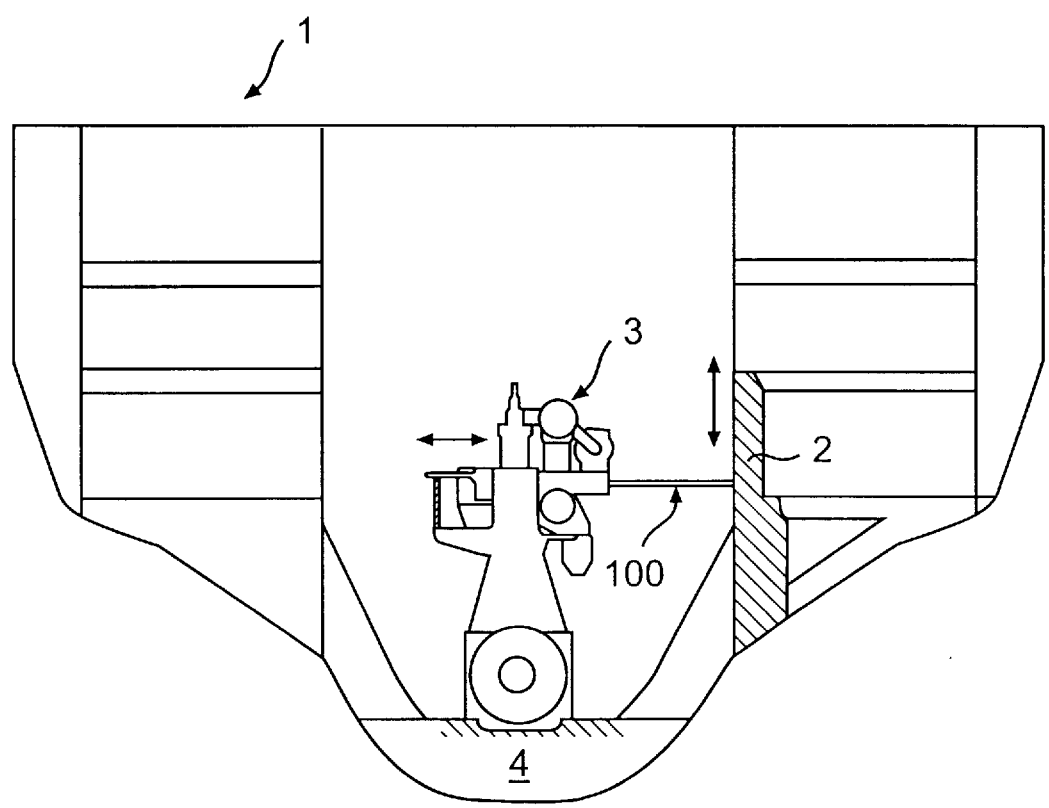
FIG. 6 is a schematic longitudinal cross-sectional view of a ship, illustrating an installation position of a top bracing for a marine engine.
Figure 7:
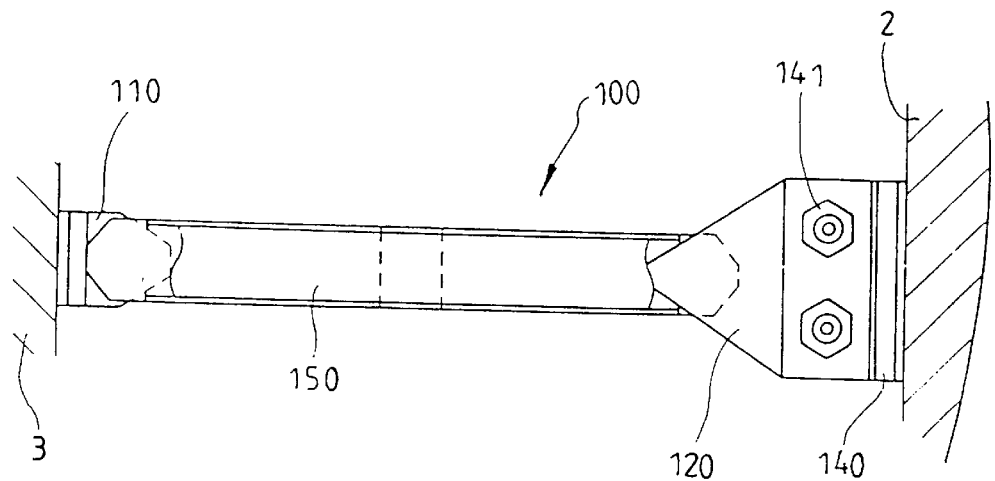
FIG. 7 is a front view illustrating a conventional top bracing for a marine engine.

FIG. 1 is a plan view illustrating a top bracing for a marine engine in accordance with an embodiment of the present invention. FIG. 2 is a front view of the top bracing for a marine engine of FIG. 1. FIG. 3 is a systematic diagram illustrating an example of a pressure adjusting system for an air tube. FIG. 4 is a graph illustrating vibration response curves which reveal relationships between engine rpm and engine vibration when the top bracing according to the present invention is applied to damp vibration of the marine engine. FIG. 5 is a flow chart for explaining a method for damping vibration of the marine engine by the top bracing according to the present invention.

As shown in FIGS. 1 and 2, a top bracing 10 for a marine engine in accordance with an embodiment of the present invention serves as a device which is installed between a hull structure 2 and the marine engine 3 in a ship to damp vibration of the marine engine 3. The top bracing 10 basically includes a beam part 20, a hull connection part 30 and an engine connection part 40. One of either the hull connection part 30 or the engine connection part 40 includes a pair of pressing plates 50, a pair of friction support brackets 60 and an elastic member 70 which is intervened between the pair of pressing plates 50.

The elastic member 70 functions to damp the vibration load of the engine 3 by adjusting pressing force which is applied by the pair of pressing plates 50 to the pair of friction support brackets 60, respectively. For example, the elastic member 70 can comprise a spring, rubber having a predetermined elasticity, wood, etc. In a preferred embodiment of the present invention, the elastic member 70 comprises an air tube 70a which is a pneumatic connection means.

Throughout this specification, the elastic member 70 will be explained as being embodied by the air tube 70a according to the preferred embodiment of the present invention. An example of the hull connection part 30 to which the pneumatic air tube 70a is applied, is depicted in FIGS. 1 and 2.

FIGS. 1 and 2 illustrate an example in which the hull connection part 30 serves as pneumatic means.

The central beam part 20 is a structural member for supporting the vibration of the engine 3, and the hull connection part 30 and the engine connection part 40 are connection members for fastening both ends of the beam part 20 to the hull structure 2 and the engine 3, respectively.

If the beam part 20 has sufficient strength to sustain or support the vibration load of the engine 3, a usable structure for the beam part 20 is not particularly limited. For example, the beam part 20 as shown in FIGS. 1 and 2 can be used. The beam part 20 as shown in FIGS. 1 and 2 is prepared by arranging a pair of steel plates 21 such that they are parallel to each other and spaced apart by a preset distance, by fixing two pairs of reinforcing steel plates 22 to upper and lower ends of the pair of steel plates 21, respectively, and by coupling each pair of reinforcing steel plates 22 with each other using a plurality of coupling plates 23.

At this time, it is preferred that the reinforcing steel plates 22 are not fixed over a predetermined interval L of the steel plates 21 adjacent to the air tube 70a, and therefore, in the predetermined interval L, the beam part 20 only includes the pair of steel plates 21. Due to this, flexibility against vibration is provided to the pair of steel plates 21 in the predetermined interval L. An eye member 24 which is attached to each coupling plate 23, is used to hang the top bracing 10 on a hook of a crane when mounting the top bracing 10.

As described above, by the fact that the beam part 20 has a double structure of the steel plates 21 and the reinforcing steel plates 22, it is possible to support the vibration of the engine 3 with a sufficient rigidity. Also, because the vibration of the engine 3 is supported in a more flexible manner over the predetermined interval L by the steel plates 21, it is possible to retard fracture of the top bracing 10 due to fatigue caused by the vibration of the engine 3.

The hull connection part 30 which connects the hull structure 2 to the beam part 20, is disposed such that it can alter an engine support rigidity depending upon a change in engine rpm. The hull connection part 30 includes the pair of pressing plates 50, the pair of friction support brackets 60 and the air tube 70a.

The pair of pressing plates 50 are, as shown in FIG. 1, plate-shaped members which extend from the beam part 20, that is, one end of the steel plates 21 adjoining the hull structure 2, toward the hull structure 2. The pair of pressing plates 50 are arranged such that they are parallel to each other and spaced apart by a preset distance.

While the pressing plates 50 can be manufactured as separate steel plates(or friction material) and connected to the steel plates 21 of the beam part 20 by welding or riveting, in this embodiment of the present invention, it is preferred that the pressing plates 50 are formed by extending one end of the beam part 20 adjoining the hull structure 2 toward the hull structure 2.

That is to say, in this embodiment of the present invention, the pressing plates 50 are not structurally distinguished from the beam part 20, and the one end of the beam part 20 adjoining the hull structure 2 is called the pressing plates 50 in association with its functionality. As will be described later in detail, the pressing plates 50 are expanded outward when the air tube 70a is held at a high pressure and contracted inward when the air tube 70a is held at a low pressure. In this connection, it is preferred that the pressing plates 50 are made of steel plate or friction material having predetermined elasticity and friction factor.

The pair of friction support brackets 60 are fixedly installed to the hull structure 2 and project toward the engine 3. The pair of friction support brackets 60 adjoin outer surfaces of the pair of pressing plates 50, respectively. The pair of friction support brackets 60 are brought into frictional contact with the pair of pressing plates 50, respectively. The pair of pressing plates 50 are fitted between the pair of friction support brackets 60, thereby to support the top bracing 10 to the hull structure 2, as will be described later.

In order to increase frictional force between the pressing plates 50 and the friction support brackets 60, it is preferred that a pair of friction plates 90 having a high frictional coefficient are attached to the outer surfaces of the pressing plates 50 and/or inner surfaces of the friction support brackets 60. In this preferred embodiment of the present invention, it is illustrated that the pair of friction plates 90 are attached to the inner surfaces of the pair of friction support brackets 60, respectively.

In an area where the pressing plates 50 and the friction support brackets 60 are brought into frictional contact with each other, the air tube 70a which is made to have sufficient strength to endure the vibration load of the engine 3, is intervened between the pair of pressing plates 50. The air tube 70a is constructed such that it can be adjusted in its internal air pressure. If the internal air pressure of the air tube 70a is changed, pressing force of the pressing plates 50 against the friction support brackets 60 varies, whereby an engine supporting state (an engine support rigidity) by the top bracing 10 varies as well.

For example, if the internal air pressure of the air tube 70a is held at a relatively high pressure, the air tube 70a biases the pair of pressing plates 50 outward. Therefore, the pressing plates 50 are forcibly brought into frictional contact with the friction support brackets 60, respectively. In this state, the top bracing 10 supports the engine 3 with a relatively high rigidity, and according to this, the top bracing 10 absorbs by its frictional force the vibration of the engine 3. On the contrary, if the internal air pressure of the air tube 70a is held at a relatively low pressure, pressing force of the air tube 70a against the pressing plates 50 is removed or lowered. Therefore, the pressing plates 50 are separated from the friction support brackets 60 or brought into frictional contact with low force with the friction support brackets 60. In this state, the top bracing 10 supports the engine 3 with a relatively low rigidity, and according to this, the top bracing 10 does not absorb or absorbs little of the vibration of the engine 3. Namely, as the internal air pressure of the air tube 70a is adjusted, an engine support rigidity of the top bracing 10 of the present invention is altered.

Internal air pressure adjustment operations for the air tube 70a can be performed using the conventional art. For example, as shown in FIG. 3, an air inlet 71 is connected by way of a first valve 73 to a pneumatic source 72 such as a pneumatic tank or a compressor, an air outlet port 74 having a second valve 75 is connected to the air tube 70a, and a controller 76 is constructed such that it controls opening and closing of the first and second valves 73 and 75 thereby to adjust the air supplying amount into the air tube 70a.

Here, for the top bracing 10 of the present invention, while a separate pneumatic tank, a compressor, etc. can be used as the pneumatic source 72, because a pneumatic arrangement which is arranged for enabling highly pressurized air to be used for a variety of applications is generally installed on the ship, it is possible for pressurized air to be supplied to the air tube 70a from the pneumatic arrangement (not shown). This is preferable in view of the fact that a separate pneumatic apparatus need not be additionally provided for ensuring a proper operation of the top bracing 10.

The internal air pressure of the air tube 70a can be adjusted in two stages including a high pressure and a low pressure or to multiple stages, depending upon a vibration status of the engine 3. Hereinafter, the case in which the internal air pressure of the air tube 70a is adjusted in two stages, will be described in detail with reference to FIGS. 4 and 5.

Engine vibration characteristics in accordance with engine rpm, that is, a vibration response curve, varies depending upon an engine support rigidity. Accordingly, in a state wherein the top bracing 10 of the present invention is mounted to the engine 3, by obtaining vibration response curves of the engine for the cases in each of which the internal air pressure of the air tube 70*a* is changed thereby to alter an engine support rigidity, that is, for example, by obtaining vibration response curves when the internal air pressure of the air tube 70*a* is held at a relatively low pressure P1 and when the internal air pressure of the air tube 70*a* is held at a relatively high pressure P2, as shown in FIG. 4, two vibration response curves having different apexes are resulted in.

In other words, in the case that the internal air pressure of the air tube 70*a* has a low pressure value P1, engine vibration is maximized when engine rpm is f1 (vibration response curve Y1), and in the case that the internal air pressure of the air tube 70*a* has a high pressure value P2, engine vibration is maximized when engine rpm is f2 (vibration response curve Y2). The two vibration response curves are crossed with each other at a critical rpm f3.

As described above, in accordance with engine vibration characteristics which vary depending upon a change in the internal air pressure of the air tube 70*a*, when engine rpm is no less than the critical rpm f3, the internal air pressure of the air tube 70*a* is held at the low pressure P1 (the vibration of the engine follows the curve Y1). Also, when engine rpm is no greater than the critical rpm f3, the internal air pressure of the air tube 70*a* is held at the high pressure P2 (the vibration of the engine follows the curve Y2). Consequently, it is possible to always hold the vibration of the engine 3 in a hatched area of FIG. 4. Here, in the case that air is supplied to the air tube 70*a* using the pneumatic arrangement which is arranged in the ship for a variety of other applications, the high pressure P2 is an air pressure which is generally used in the pneumatic arrangement provided to the ship.

Consequently, if the internal air pressure of the air tube 70*a* is changed by adequately controlling opening and closing of the first and second valves 73 and 75 depending upon engine rpm in a state wherein the top bracing 10 having the air tube 70*a* is installed between the hull structure 2 and the engine 3, when compared to the conventional art in which an engine support state is not changed, that is, the vibration of the engine depending upon engine rpm develops along a single vibration response curve (Y1 or Y2), the vibration of the marine engine 3 can be remarkably damped according to the present invention.

Hereinafter, a method for damping the vibration of the marine engine 3 by the top bracing 10 according to the present invention will be described with reference to FIG. 5. First, in a state wherein an engine support rigidity is altered by changing the internal air pressure of the air tube 70*a*, vibration response curves of the engine 3 are obtained, and then, engine vibration characteristics are grasped by a critical rpm which is given on the vibration response curves (S1).

Next, a current engine rpm is detected, and then, the detected current engine rpm is compared with the critical rpm f3 (S2).

Depending upon the comparison result, if the judgment is positive, that is, engine rpm is no greater than the critical rpm f3, by manipulating the first and second valves 73 and 75 such that the first valve 73 is opened and the second valve 75 is closed, the internal air pressure of the air tube 70*a* is held at the high pressure P2 (S3 and S4). By this, due to the fact that the pressing plates 50 and the friction support brackets 60 are brought into frictional contact with each other and the frictional force normally acts between the pressing plates 50 and the friction support brackets 60 (S5), the vibration of the engine 3 is generated along the vibration response curve Y2 below the critical rpm f3, whereby the vibration of the engine is minimized (S6).

Depending upon the comparison result, if the judgment is negative, that is, engine rpm is greater than the critical rpm f3, by manipulating the first and second valves 73 and 75 such that the first valve 73 is closed and the second valve 75 is opened, the internal air pressure of the air tube 70*a* is held at the low pressure P1 (S3' and S4') By this, due to the fact that the pressing plates 50 and the friction support brackets 60 are separated from each other or brought into frictional contact by low force with each other, the frictional force between the pressing plates 50 and the friction support brackets 60 is removed or maintained at a low value (S5'). Hence, the vibration of the engine 3 is generated along the vibration response curve Y1 above the critical rpm f3, whereby the vibration of the engine is minimized (S6).

Here, in the case that air is supplied to the air tube 70*a* using the pneumatic arrangement which is arranged in the ship for a variety of other applications, the high pressure P2 is an air pressure which is generally used in the pneumatic arrangement provided in the ship, and the low pressure P1 is an air pressure which is less than the high pressure P2 and no less than the atmospheric pressure.

As stated above, by adequately adjusting the internal air pressure of the air tube 70*a* depending upon engine rpm, the vibration of the engine 3 can be minimized (in the hatched area as shown in FIG. 4), shock due to the vibration of the engine 3 which shock is applied to the top bracing 10 can be dissipated by a shock-absorbing function which is owned by the air tube 70*a*, and the vibration which is transmitted to the upper end of the engine 3 and the surrounding components can be effectively reduced.

While, in the above statements, it is explained that the internal air pressure of the air tube 70*a* is adjusted in two stages including a high pressure and a low pressure, persons skilled in the art will appreciate that the internal air pressure of the air tube 70*a* can be controllably adjusted into three or more stages, thereby to damp the vibration of the engine in a further subdivided manner. In this connection, by controlling the internal air pressure of the air tube 70*a* such that it is continuously changed over the entire rpm range, it is possible to minimize the vibration of the engine 3 over the entire rpm range.

Figure 8:
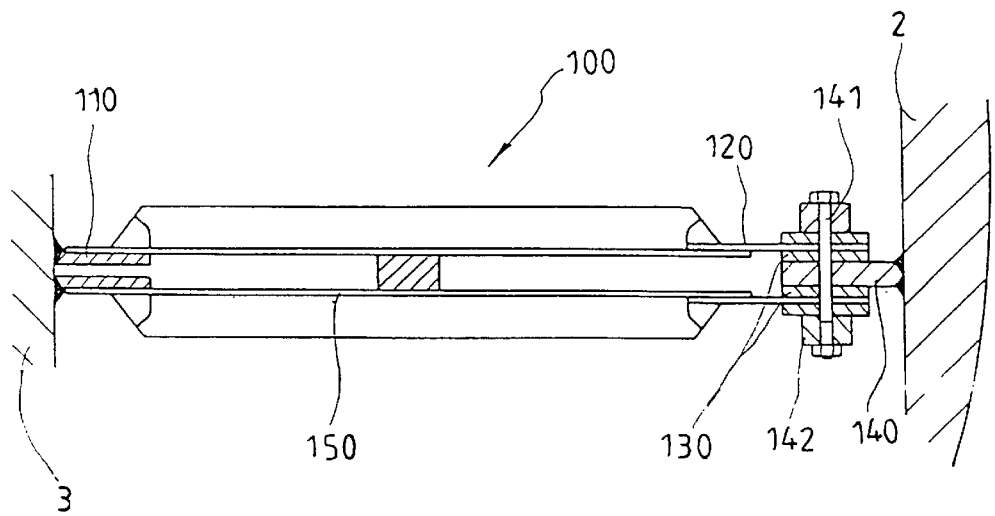
FIG. 8 is a plan view of the conventional top bracing for a marine engine of FIG. 7.
Figure 9:
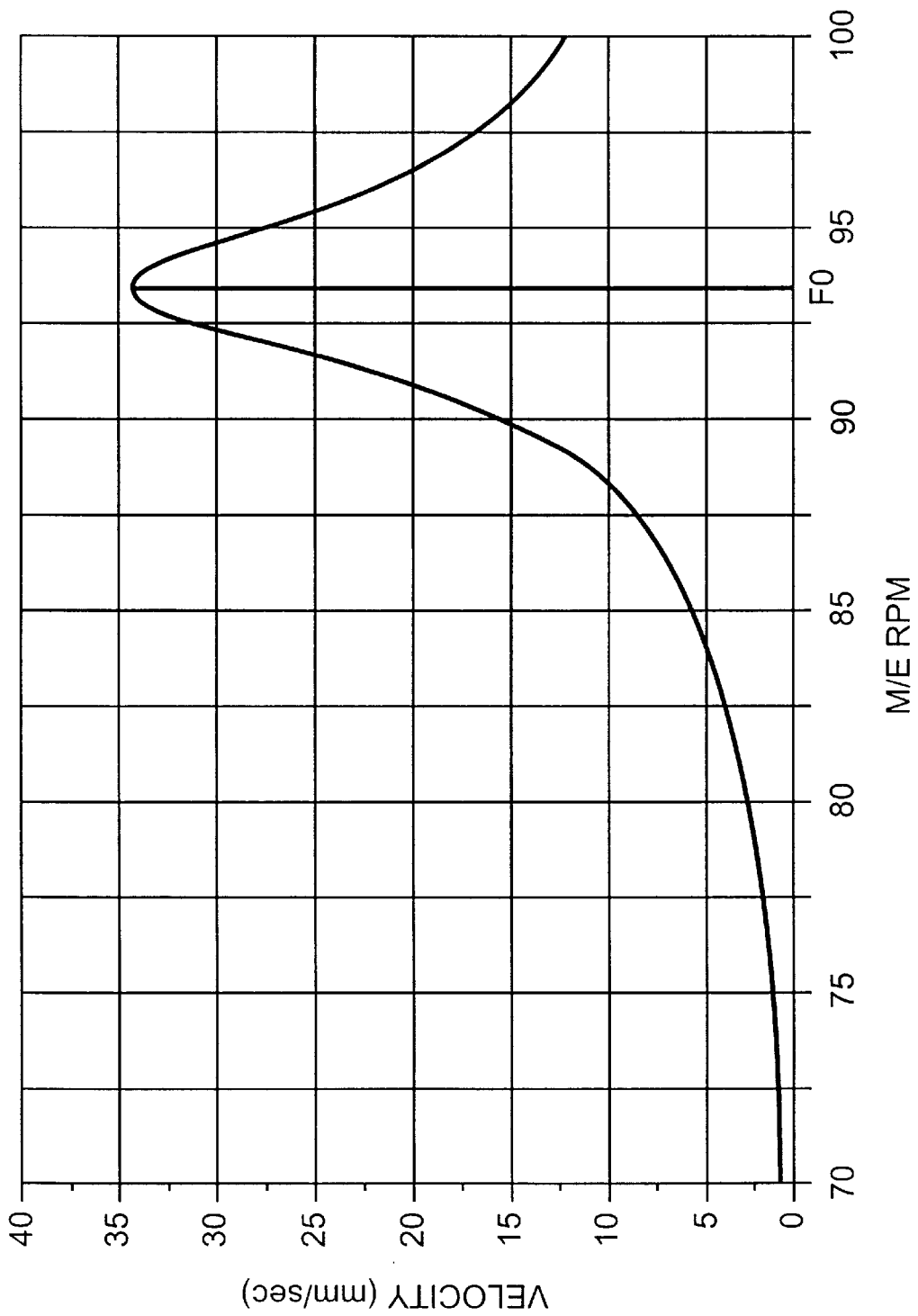
FIG. 9 is a graph illustrating a vibration response curve which shows a relationship between engine rpm and engine vibration when the conventional top bracing is applied to damp vibration of the marine engine.

As the other of either the hull connection part 30 or the engine connection part 40 in which the air tube 70*a* is not installed, that is, the engine connection part 40 in the preferred embodiment of the present invention, the pattern as shown in FIG. 8 which is used for the conventional top bracing or another pattern in which the beam part 20 is directly welded to the engine 3, etc. can be used. In this regard, it is preferred that a connection plate 80 capable of accommodating a change in a length between the hull structure 2 and the engine 3 is used.

In a concrete way, as shown in FIG. 1, one end of the connection plate 80 is connected to the engine 3 by welding, and the other end of the connection plate 80 is connected to the pair of steel plates 21 of the beam part 20 by means of bolts 82 and nuts 83. At this time, it is preferred that a slot 81 is formed in one of the steel plates 21 and the connection plate 80 such that it has an elongated form, whereby positions in which the bolts 82 are locked to the nuts 83 are regulated left and right in a range of the length of the slot 81. FIG. 1 illustrates an example in which the slot 81 is defined in the connection plate 80. The drawing reference numeral 84 represents shock-absorbing plates which function to facilitate locking of the connection plate 80 and the steel plates 21 by the bolts 82 and prevent the two members from being slid away from each other.

As described above, owing to the construction of the engine connection part 40 having the connection plate 80, even when relative positions of the hull structure 2 and the engine 3 are varied by a change in wave or cargo amount, since connecting operations between the engine 3 and the top bracing 10 can be performed while having flexibility by a length of the slot 81, it is possible to effectively damp an excessive load which is exerted to the top bracing 10, cooperatively with the pneumatic connection arrangement which is applied to the hull connection part 30.

Furthermore, when the top bracing 10 is installed between the engine 3 and the hull structure 2, because the locking positions between the bolts 82 and the nuts 83 can be selected in the range of the length of the slot 81, in the case that the top bracing 10 is prefabricated on the ground, it is not necessary to precisely accord a length of the top bracing 10 to an actual length measured between the hull structure 2 and the engine 3 in the ship. Therefore, when installing or mounting the top bracing 10, length adjustment operations for according the length of the top bracing 10 to the actual length measured between the hull structure 2 and the engine 3 can be easily performed.

While it is explained in the above embodiment that the pair of pressing plates 50, the pair of friction support brackets 60 and the air tube 70*a* are disposed adjacent the hull structure 2 and the connection plate 80 is located adjacent the engine 3, persons skilled in the art will appreciate that the above-mentioned components can be arranged vice versa.

As a result, a top bracing for a marine engine according to the present invention, constructed as mentioned above, provides advantages in that, since vibration of the marine engine can be remarkably damped over an entire rpm range by a pneumatic connection arrangement using an air tube, it is possible to minimize damage of the engine and its surrounding components, which damage is caused by the vibration of the engine. Moreover, mounting and repairing operations for the top bracing can be implemented in an easier manner.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A top bracing for a marine engine, comprising:
 a beam part for transmitting vibration load of the engine to a hull structure;
 a hull connection part for connecting the beam part to the hull structure; and
 an engine connection part for connecting the engine to the beam part;
 one of either the hull connection part or the engine connection part including
  a pair of pressing plates connected to the beam part and arranged parallel to each other with a predetermined distance therebetween,
  a pair of friction support brackets fastened to the hull structure or the engine such that they are close to cuter surfaces of the pair of pressing plates, respectively, and
  an elastic member intervened between the pair of pressing plates for damping the vibration load of the engine by adjusting pressing force which is applied by the pair of pressing plates to the pair of friction support brackets.

2. The top bracing as claimed in claim 1, wherein the other of either the hull connection part or the engine connection part includes a connection plate possessing a slot which is defined therein and having one end which is connected to the hull structure or the engine and the other end which is connected to the beam part by means of bolts and nuts, the bolts passing through the slot.

3. The top bracing as claimed in claim 1, wherein the elastic member comprises an air tube which is adjusted in its internal air pressure thereby to adjust the pressing force which is applied by the pair of pressing plates to the pair of friction support brackets.

4. The top bracing as claimed in claim 1 or 3, wherein the air tube has an air inlet port connected to a pneumatic source via a first valve which can be regulated in its opening and closing and an air outlet port having a second valve which can be regulated in its opening and closing.

5. The top bracing as claimed in claim 4, wherein the pneumatic source is a pneumatic apparatus which is installed for supplying high pressure air generally used in a ship.

6. The top bracing as claimed in claim 1 or 2, wherein a pair of friction plates having a high friction coefficient are attached to either the outer surfaces of the pair of pressing plates or inner surfaces of the pair of friction support brackets, respectively.

7. The top bracing as claimed in claim 1 or 2, wherein the beam part comprises a pair of steel plates arranged parallel to each other with a preset distance therebetween, two pairs of reinforcing steel plates fixed to upper and lower ends of the pair of steel plates, respectively, and a plurality of coupling plates for coupling each pair of reinforcing steel plates with each other; and the reinforcing steel plates are not fixed over a predetermined interval of the steel plates adjacent to the elastic member.

8. A method for damping vibration of a marine engine, comprising the steps of:
 learning engine vibration characteristics by changing an internal air pressure of an air tube in a state wherein a top bracing having the air tube is mounted between a hull structure and the engine, to alter an engine support rigidity, and by obtaining a critical rpm from engine vibration response curves for respective states which have different support rigidities;
 comparing a current engine rpm with the critical rpm; and
 holding the internal air pressure of the air tube at a relatively high pressure under an engine operating condition in which the current engine rpm is not greater than the critical rpm and at a relatively low pressure under another engine operating condition in which the current engine rpm is greater than the critical rpm.

9. The method as claimed in claim 8, wherein the high pressure is an air pressure which is generally used in the ship, and the low pressure is less than the high pressure and no less than the atmospheric pressure.

10. The method as claimed in claim 8, wherein the internal air pressure is changed over at least three stages depending upon engine rpm.

\* \* \* \* \*